United States Patent [19]
Leimgruber et al.

[11] 3,922,285
[45] Nov. 25, 1975

[54] PROCESS FOR THE METHYLENATION OF CATECHOLS
[75] Inventors: Willy Leimgruber, Montclair, N.J.; Alexander E. Wick, Riehen, Switzerland
[73] Assignee: Hoffmann-La Roche Inc., Nutley, N.J.
[22] Filed: Dec. 6, 1972
[21] Appl. No.: 312,468

Related U.S. Application Data
[62] Division of Ser. No. 128,572, March 26, 1971, Pat. No. 3,726,924.

[52] U.S. Cl...... 260/340.5; 260/293.63; 260/289 R; 260/326.85; 260/583 P
[51] Int. Cl.² .................................... C07D 317/54
[58] Field of Search ................................ 260/340.5

[56] References Cited
UNITED STATES PATENTS
3,436,403  4/1969  Cornforth ................ 260/340.5 X
3,790,601  2/1974  Gallay .................... 260/340.5

OTHER PUBLICATIONS
Weingarten et al., "Journ. Amer. chem. Soc.," Vol. 88 (4), 1966, p. 850.

Primary Examiner—Donald G. Daus
Assistant Examiner—J. H. Turnipseed
Attorney, Agent, or Firm—Samuel L. Welt; Bernard S. Leon; Frank P. Hoffman

[57] ABSTRACT

A method for the methylenation of catechols via the reaction of catechols with methylene chloride in the presence of selected strong bases is described. This process has wide applicability in the field of synthetic organic chemistry, especially in natural product syntheses.

2 Claims, No Drawings

PROCESS FOR THE METHYLENATION OF CATECHOLS

CROSS-REFERENCE TO RELATED APPLICATIONS

This application is a divisional application of copending application Ser. No. 128,572, filed Mar. 26, 1971 now U.S. Pat. No. 3,726,924, in the names of Leimgruber and Wick.

BACKGROUND OF THE INVENTION

In recent years, growing interest in attempts to synthesize natural products, particularly those in the alkaloid family, has accentuated the need for a facile and efficient process for the methylenation of catechols.

In the past, the preparation of methylenedioxy compounds has been accomplished following procedures such as that disclosed by W. Bonthrone and J. W. Cornforth in *Journal of the Chemical Society*, 1202 (1969). The Bonthrone and Cornforth procedure involves the preparation of 1,2-methylenedioxy compounds by treating catechols with sodium hydroxide and methylene chloride in dimethylsulfoxide at 125°–130°C. for approximately 3 hours. The relatively harsh reaction conditions limit the usefulness of procedures of this type.

We have now found that by carrying out the reaction between the catechol starting material and methylene chloride in the presence of a selected strong base, the desired 1,2-methylenedioxy compounds can be obtained in good yields, usually between 70–90 percent, using distinctly lower temperatures and simplified reaction and isolation procedures.

DETAILED DESCRIPTION OF THE INVENTION

In its broadest aspect, the present invention relates to a novel method for converting organic compounds having a catechol moiety into the corresponding 1,2-methylenedioxy compounds by reacting the catechol with methylene chloride in the presence of a selected strong base. More particularly, the present invention relates to a process for the methylenation of catechols, i.e. aromatic compounds bearing two hydroxy groups ortho to each other, which process is generically depicted in the following reaction scheme:

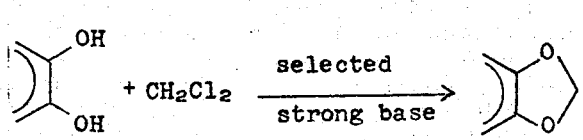

In a preferred aspect of the present invention, the catechol starting materials are substituted benzene derivatives, i.e. compounds of the formula

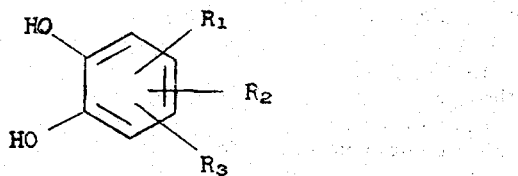

wherein $R_1$, $R_2$ and $R_3$ independently signify hydrogen, lower alkyl, or lower alkoxy so that by following the instant process there are obtained compounds of the formula

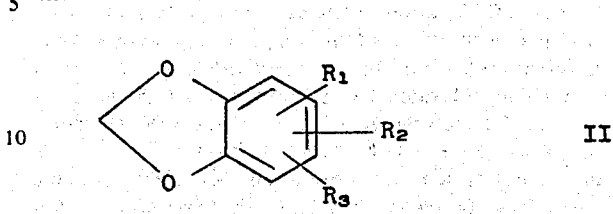

wherein $R_1$-$R_3$ are as described above.

In another preferred aspect of the present invention, the instant process can be employed in the preparation of heterocyclic ring systems such as the isoquinoline, benzazepine, benzazocine, and benzodiazocine systems. In a particularly preferred aspect, 6,7-dihydroxyisoquinoline compounds are employed as the starting materials so that by following the instant process there are obtained 6,7-methylenedioxyisoquinolines.

In effecting the methylenation of catechols by the instant process, the catechol starting materials are reacted with methylene chloride in the presence of selected strong bases. The successful operation of the reaction is due largely to the special properties of the strong bases employed. Suitable strong bases for the purposes of the present invention include tris(di-alkylamino)-methanes and aminal esters. The tris(di-alkylamino)-methanes useful for the purpose may be depicted by the following formula

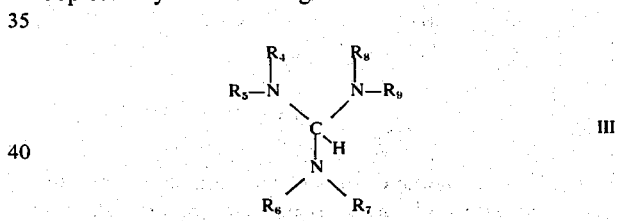

wherein $R_4$ through $R_9$ independently are lower alkyl; or $R_4$ and $R_5$, $R_6$ and $R_7$, or $R_8$ and $R_9$ taken together with their attached nitrogen atom form a saturated 5- or 6- membered heterocyclic ring selected from the group consisting of pyrrolidyl and piperidyl.

Preferred tris(di-alkylamino)methanes of formula III for the present purpose include:
 tris(dimethylamino)methane;
 tris(pyrrolidino)methane; and
 tris(piperidino)methane,
with tris(dimethylamino)methane being the most preferred base.

The animal esters useful for the purposes of the instant process may be depicted by the following formula

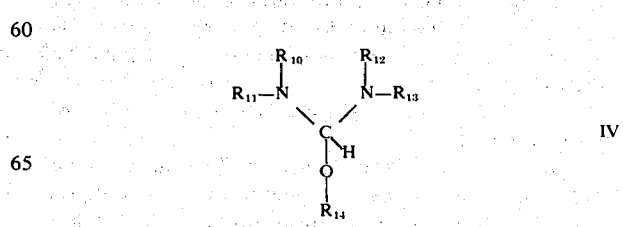

wherein $R_{10}$ through $R_{14}$ signify lower alkyl. The preferred animal esters of formula IV are bis(dimethylamino)-t-butoxymethane and bis(dimethylamino)-methoxy methane.

The methylenation of the catechol starting materials is expediently effected at temperatures above room temperature, preferably at the reflux temperature of methylene chloride. The preferred reaction temperature can be maintained by keeping the bath temperature between about 40° to about 60°C. The reaction time is not critical but is preferably sufficient to enable completion of the reaction, usually from six to twentyfour hours. It is also preferable to effect the methylenation reactions under nitrogen atmosphere using dry methylene chloride.

The tris(dimethylamino)methane employed as one of the preferred stong bases in effecting the instant process may be prepared by treating the readily available dimethylformamide dimethylacetal with excess dimethylamine in the presence of a select acidic catalyst. This preparative route can be depicted by the following reaction scheme:

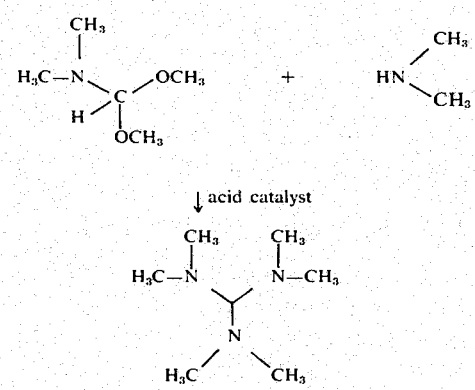

Only select acidic catalysts can bring about this conversion since both the starting materials and the end products are subject to rapid hydrolysis and since the dimethylformamide dimethylacetal is a powerful alkylating agent. Thus the acidic catalyst employed must be one that will not be de-activated, as by akylation, under the reaction conditions employed. Suitable acidic catalysts for this purpose include, for example, sterically hindered phenols, e.g. those bearing bulky alkyl groups in the positions ortho to the phenol groups, such as 2,6-di-t-butylphenol, 2,4,6-tri-t-butylphenol, and the like; with 2,4,6-tri-t-butylphenol being the preferred acidic catalyst.

The above described process for preparing tris(dimethylamino)methane is novel and as such forms a part of the present invention.

As used throughout this disclosure, the term "lower alkyl" denotes both straight and branced chain hydrocarbon groups having from 1 to 7 carbon atoms, such as methyl, ethyl, propyl, isopropyl, butyl, t-butyl, and the like. The term lower alkoxy denotes a —O— lower alkyl group wherein the lower alkyl moiety is as described above.

The following examples further illustrate the invention. All temperatures are given in degrees centigrade and all methylenation reactions were carried out under nitrogen atmosphere using drying methylene chloride.

EXAMPLE 1

Preparation of bis(dimethylamino)-tert.-butoxymethane 219.2 g. (3 mole) N,N-dimethylformamide (freshly distilled from BaO) and 285.2 ml. (378.3 g; 3 mole) dimethyl sulfate (distilled) was combined and stirred mechanically. The temperature of the exothermic reaction was maintained between 40° and 55° by means of a cold water bath. When the exothermic reaction had subsided, the colorless (or faintly yellow) liquid was heated at 80° for 1½ hours.

The resulting oil was added dropwise over 1½ hours to a solution of 217 g. (4.82 mole) dimethylamine in 1400 ml. dry benzene under vigorous agitation at room temperature. The two phase mixture was then heated at reflux for 1½ hours with stirring using a tight seal to avoid loss of dimethylamine at reflux and left at room temperature overnight. The upper layer (benzene) was syphoned off, 250 ml. dry ether added to the remaining yellowish oil, stirred for 10 minutes and the upper phase syphoned off again. This wash procedure was repeated two more times. The residual solvent was evaporated first at room temperature by means of an aspirator, then under high vacuum at 40°–45°.

In a 3 liter, 3-necked flask equipped with reflux condenser, mechanical stirred and Gooch tube, the resulting oil was suspended in 1½ l. dry ether, and 337.6 g. (3 mole) potassium tert.-butoxide was added with stirring at such a rate that moderate reflux resulted. After all of the alkoxide had been added, the reaction mixture was heated at reflux for one hour, cooled to room temperature and filtered through a sintered glass funnel (medium). The sintered solids were washed with four 100 ml. portions of dry ether, all filtrates combined and the solvent removed under vacuum (not to exceed 20 mm) on the rotary evaporator at a bath temperature of 10°–15°.

The remaining turbid liquid was distilled under high vacuum to give bis(dimethylamino)-tert.-butoxymethane as a colorless liquid, b.p. 32°–35°/2.7 mm (bath 43°–46°).

EXAMPLE 2

Preparation of tris(dimethylamino)methane

A mixture of 88 g. (0.71 mole) of N,N-dimethylformamide dimethylacetal and 400 mg. (1.53 mmole) of 2,4,6-tri-t-butylphenol was placed in a 250 ml. 3-neck round bottom flask which was lowered into an oil bath that was kept at a starting temperature of 117°C. A constant stream of dimethylamine, dried over potassium hydroxide pellets, was passed through the fritted gas inlet at such a rate that the temperature of the distillation head at no time exceeded 45°. As the reaction proceeded by removal of methanol, the oil bath temperature was gradually raised from 117° to 145°, thus causing a gradual increase of the reaction temperature, from initially 85° to 125°–128°. After 26 hours, when a substantial portion of the starting acetal was converted to tris-(dimethylamino)methane, the oil bath was removed and, after cooling, the flask was disconnected. Its content was then flash-distilled at 6 mmHg into a dry ice-cooled receiver.

The volatile products were fractionated at 22 mmHg through a 150 mm Vigreux column. The fraction showing a boiling point of 61°–65° at 22 mmHg contained the above-named product.

EXAMPLE 3

Preparation of tris(pyrrolidino)methane a. From N,N-dimethylformamide dimethyl acetal 24.7 g. of 96.5% N,N-dimethylformamide dimethyl acetal (0.2 mol) in 200 g. (9.8 moles) of pyrrolidine freshly distilled over KOH was kept at reflux for 48 hours (bath temperature 120°–140°). The methanol formed during the reaction was removed constantly through a distillation head connected to the top of a reflux condenser kept at 75°. The excess pyrrolidine was then distilled off at atmospheric pressure and the residual yellow liquid distilled under reduced pressure to give, after a forerun, tris(pyrrolidino)methane as a yellowish liquid, b.p. 122°–124°/3 mm.

b. From tris(dimethylamino)methane 14.5 g. (10 mmol) of tris(dimethylamino)methane and 50 g. (70 mmol) of pyrrolidine were kept at reflux for 1 hour. The excess pyrrolidine was removed by distillation at atmospheric pressure. Distillation of the residue under reduced pressure gave, after a forerun, tris(pyrrolidino)methane as a colorless liquid, b.p. 103°–104°/0.4 mm.

EXAMPLE 4

Preparation of tris(piperidino)methane 134 g. of 89% pure N,N-dimethylformamide dimethyl acetal (1 mol), 595 g. (7 mol) of piperidine (distilled over KOH) and 200 ml. of DMF were heated at reflux for 8 hours with constant removal of the methanol formed. The excess piperidine was distilled off under aspirator pressure and the residue distilled under high vacuum to yield, after a forerun, tris(piperidino)methane as a colorless liquid, b.p. 129°–134°/0.5 mm which solidified on standing, m.p. 60°–65°.

EXAMPLE 5

Preparation of 1,2-methylenedioxybenzene a. With bis(dimethylamino)-t-butoxymethane 3.0 g. (27 mmol) of catechol in 80 ml. of methylene chloride was added dropwise over a period of 10 minutes to 15.5 g. (89 mmol) of bis(dimethylamino)-t-butoxymethane which had been prewarmed to 60°. After the addition (1 hour) the clear mixture was kept at 60° for further 6 hours during which time the methylene chloride was refluxing. The reaction material was taken up in ethyl acetate washed with 2N sodium hydroxide and brine. The residual liquid on removal of the solvent was distilled in a Kugelrohr at 84°–86°/16 mm to give 1,2-methylenedioxybenzene.

b. With tris(dimethylamino)methane 2.2 g. (20 mmol) of catechol in 75 ml. of methylene chloride was added dropwise over a period of 10 minutes to 8.7 g. (60 mmol) of tris(dimethylamino)methane, preheated at 55°. Stirring and warming was continued for 17 hours, after which time the reaction mixture was diluted with 200 ml. methylene chloride and washed with 1N hydrochloric acid (3 times), 1N sodium hydroxide (1 time) and water (1 time). The liquid residue obtained on evaporation of the solvent was distilled in a Kugelrohr at 85°/15 mm to give 1,2-methylenedioxybenzene.

EXAMPLE 6

Preparation of 3,4-methylenedioxytoluene 3.1 g. (25 mmol) of 4-methylcatechol in 12 ml. of methylene chloride was added at room temperature over a period of 2 hours to 9.57 g. (55 mmol) bis(dimethylamino)-t-butoxymethane in 50 ml. of dry methylene chloride and the mixture kept at reflux for 6½ hours. After standing at room temperature overnight, the solvent was taken off, the residue taken up in ethyl acetate, the solution extracted twice with 2N sodium hydroxide, washed three times with brine and dried over sodium sulfate. Removal of the solvent and Kugelrohr distillation of the residual brownish oil gave colorless 3,4-methylenedioxytoluene, b.p. 87°–92°/22 mm.

EXAMPLE 7

Preparation of 4,5-methylenedioxy-1,2-xylene a. With bis(dimethylamino)-t-butoxymethane To 5.74 g. (33 mmol) of bis(dimethylamino)-t-butoxymethane, stirred magnetically under nitrogen atmosphere at 55°, 1.38 g. (10 mmol) of 4,5-dimethylcatechol in 40 ml. of dry methylene chloride was added over a period of 10 minutes and the resulting reaction mixture kept at reflux (bath temperature 55°) for 21 hours. Evaporation of the solvent and excess reagent under reduced pressure gave an orange colored solid which was stirred with 100 ml. of ether for 30 minutes, filtered and the filtrate taken to dryness. Kugelrohr distillation of the solid residue at 90°/2.5 mm gave colorless crystalline 4,5-methylenedioxy-1,2-xylene, m.p. 47°–48°.

b. With tris(dimethylamino)methane

As described uner (a) 8.6 g. of a mixture of 55% tris(dimethylamino)methane (32.6 mmol) and 45% DMF, and 1.38 g. (10 mmol) of 4,5-dimethylcatechol in 40 ml. methylene chloride gave, after 21 hours, 4,5-methylenedioxy-1,2-xylene.

c. With tris(pyrrolidino)methane

As described under a) 7.4 g. (33 mmol) of tris(pyrrolidino)-methane and 1.38 g. (10 mmol) of 4,5-dimethylcatechol in 40 ml. of methylene chloride were reacted. After 20 hours, the reaction mixture was taken up in more methylene chloride, washed consecutively with 1N hydrochloric acid (3 times), 1N sodium hydroxide (twice) and water (once), dried and the solvent removed. The reaction mixture was distilled and the resulting solid residue dissolved in methylene chloride, filtered and, after removal of the solvent, distilled in a Kugelrohr to yield 4,5-methylenedioxy-1,2-xylene.

d. With tris(piperidino)methane

As described under (c) 3.2 g. (12 mmol) of tris(piperidino)-methane and 522 mg. (4 mmol) of 4,5-dimethylcatechol in 25 ml. methylene chloride gave, after 18 hours, crystalline 4,5-methylenedioxy-1,2-xylene.

EXAMPLE 8

Preparation of 2,3-methylenedioxyanisole

The reaction was carried out with 23 g. (132 mmol) of bis(dimethylamino)-t-butoxymethane and 5.6 g. (40 mmol) of 3-methoxycatechol in 80 ml. of methylene chloride. After 20 hours the reaction mixture was taken to dryness under reduced pressure and the residue distilled at 78°–82°/2mm to yield crystalline 2,3-methylenedioxyanisole.

EXAMPLE 9

Preparation of
1-(4-chlorophenethyl)-2-pivaloyl-6,7-methylenedioxy-1,2,3,4-tetrahydroisoquinoline To 1.0 g. (2.6 mmol) of 1-(4-chlorophenethyl)-2-pivaloyl-6,7-dihydroxy-1,2,3,4-tetrahydroisoquinoline suspended in 10 ml. of dry methylene chloride, was added 1.73 ml. (1.47 g., 8.43 mmol) of bis(dimethylamino)-t-butoxymethane causing the formation of a clear green solution which was kept at 50° under nitrogen for 6 hours. The reaction mixture was taken up in ethyl acetate, washed twice with 1N sodium hydroxide, once with 1N hydrochloric acid and twice with brine and dried over sodium sulfate. The residual heavy oil obtained after removal of the solvent was chromatographed on 50 g. of silica gel. Benzene/ether 9:1 and then 1:1 eluted the desired product as a colorless oil. 1-(4-Chlorophenethyl)-2-pivaloyl-6,7-methylenedioxy-1,2,3,4-tetrahydroisoquinoline crystallized from ether/heptane, m.p. 97°–99°.

The starting material is prepared as follows:

4.0 g. (108 mmol) of sodium borohydride was added portionwise to 10 g. (30.1 mmol) of 1-(4-chlorophenethyl)-6,7-dimethoxy-3,4-dihydroisoquinoline in 125 ml. of methanol under stirring. During the addition, the reaction temperature was maintained below 30° by means of a cold water bath. The reaction mixture was stirred overnight, then taken down to dryness under reduced pressure, and the resulting residue dissolved in chloroform. The chloroform solution was washed with dilute ammonia, water and dried over sodium sulfate. Removal of the solvent gave 1-(4-chlorophenethyl)-6,7-dimethoxy-1,2,3,4-tetrahydroisoquinoline as a crystalline product, which was recrystallized from ether, m.p. 63°–64°.

6.7 g. (19.8 mmol) of 1-(4-chlorophenethyl)-6,7-dimethoxy-1,2,3,4-tetrahydroisoquinoline in 200 ml. of 48% hydrobromic acid was kept at 125° for 7 hours. On cooling, the hydrobromide crystallized and was collected. A sample was recrystallized from ethanol, m.p. 226°–232°.

980 mg. (3.23 mmol) of the free base of the hydrobromide (generated by treatment of the hydrobromide with dilute ammonia) was added to a solution of 1.363 g. (11.31 mmol) of pivaloyl chloride in 15 ml. of methylene chloride. Gradual dissolution of the suspension was observed when 358 mg. (3.23 mmol) of triethylamine in 10 ml. of methylene chloride was added dropwise. After 2 hours TLC analysis showed consumption of all starting material. The resulting reaction mixture was stirred at room temperature for two days in 10 ml. of 1N sodium bicarbonate, taken up in ethyl acetate washed with brine, dried and the solvent evaporated to yield 1-(4-chlorophenethyl)-2-pivaloyl-6,7-dihydroxy-1,2,3,4-tetrahydroisoquinoline, recrystallized from ethyl acetate, m.p. 209°–210°.

We claim:

1. A process for the methylenation of catechols comprising the step of reacting a catechol of the formula

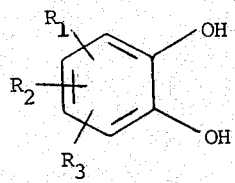

wherein $R_1$, $R_2$ and $R_3$ are selected from the group consisting of hydrogen $C_1$–$C_7$, lower alkyl and lower alkoxy with methylene chloride in the presence of a strong base selected from the group consisting of tris(dimethylamino) methane, tris(pyrrolidino)methane, tris(piperidino)methane, bis)dimethylamino)-t-butoxymethane and bis(dimethylamino)-methoxymethane.

2. A process for the preparation of an aromatic compound of the formula

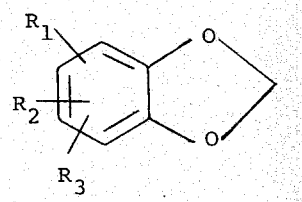

wherein $R_1$, $R_2$ and $R_3$ are selected from the group consisting of hydrogen $C_1$–$C_7$, lower alkyl and lower alkoxy comprising the step of reacting an aromatic compound of the formula

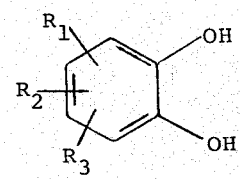

with methylene chloride in the presence of a strong base selected from the group consisting of tris(dimethylamino) methane, tris(pyrrolidino)methane, tris(piperidino)methane, bis(dimethylamino)-t-butoxymethane and bis(dimethylamino) -methoxymethane.

* * * * *